United States Patent
Boothby (10) Patent No.: US 11,816,667 B2
(45) Date of Patent: Nov. 14, 2023

(54) GENERATION OF WEB PAGES FOR VERIFICATION OF DATA

(71) Applicant: IPCO 2012 LIMITED, London (GB)

(72) Inventor: Robert Boothby, London (GB)

(73) Assignee: IPCO 2012 LIMITED, London (GB)

(*) Notice: Subject to any disclaimer, the term of this patent is extended or adjusted under 35 U.S.C. 154(b) by 295 days.

(21) Appl. No.: 16/313,680

(22) PCT Filed: Jun. 29, 2017

(86) PCT No.: PCT/GB2017/051896
§ 371 (c)(1),
(2) Date: Dec. 27, 2018

(87) PCT Pub. No.: WO2018/002620
PCT Pub. Date: Jan. 4, 2018

(65) Prior Publication Data
US 2019/0230080 A1    Jul. 25, 2019

(30) Foreign Application Priority Data

Jun. 30, 2016    (GB) .................................... 1611455

(51) Int. Cl.
*G06Q 20/40* (2012.01)
*H04L 9/40* (2022.01)
(Continued)

(52) U.S. Cl.
CPC ....... *G06Q 20/4014* (2013.01); *H04L 63/083* (2013.01); *H04L 63/0884* (2013.01); *G06F 3/0482* (2013.01); *G06F 3/0483* (2013.01)

(58) Field of Classification Search
CPC ... H04L 63/0884; H04L 63/083; H04L 9/321; G06Q 30/02; G06Q 30/0601;
(Continued)

(56) References Cited

U.S. PATENT DOCUMENTS 10,318,941 B2 *   6/2019   Chawla .................. G06Q 10/10
10,846,670 B2 *  11/2020   Chawla .................. G06Q 10/10
(Continued)

FOREIGN PATENT DOCUMENTS

CN    103443813 A    12/2013
MX    2011007356 A    1/2012
(Continued)

OTHER PUBLICATIONS

Murdoch et al. "Verified by Visa and Mastercard Secure Code: or, How Not to Design Authentication" Financial Cryptography and Data Security 10, Jan. 25-28, 2010 TENERIFE (Year: 2010).*

(Continued)

*Primary Examiner* — Kelly S. Campen
(74) *Attorney, Agent, or Firm* — Pramudji Law Group PLLC; Ari Pramudji (57) ABSTRACT

Provided herein is a method for delivering web content to a computer user where the computer user must provide data for verification. A control presented by a first web page provided by a requesting server of a requesting party may be selected to request a further web page where data may be entered that requires verification. The requesting server may redirect the computer user to a verifying server that may provide a second web page to fulfil the request for the further web page. The second web page may be presented as a foreground window positioned over a backdrop frame. The foreground window may be provided with fields for entering the data and the backdrop frame may be provided by the requesting party. The verifying server may verify data entered in the foreground window and may send the requesting server a notification as to whether the verification was successful.

9 Claims, 6 Drawing Sheets

(51) Int. Cl.
*G06F 3/0482* (2013.01)
*G06F 3/0483* (2013.01)

(58) Field of Classification Search
CPC ........... G06Q 30/0641; G06Q 30/0277; G06Q 20/0855; G06Q 20/4012; G06Q 40/00; G06F 21/31
USPC ...... 705/35, 39, 26.1, 26.2, 27.1, 50, 38, 44; 235/379
See application file for complete search history.

(56) References Cited

U.S. PATENT DOCUMENTS

| | | | | |
|---|---|---|---|---|
| 2009/0307133 | A1* | 12/2009 | Holloway | G06Q 20/10 705/35 |
| 2010/0174620 | A1* | 7/2010 | Stringfellow | G06Q 20/227 705/26.1 |
| 2011/0321133 | A1 | 12/2011 | Grieve | |
| 2012/0209735 | A1* | 8/2012 | Subramanian | H04L 9/321 705/26.1 |
| 2013/0211944 | A1* | 8/2013 | Momin | G06Q 30/06 705/26.2 |
| 2013/0290203 | A1* | 10/2013 | Purves | G06F 16/972 705/319 |
| 2013/0346302 | A1* | 12/2013 | Purves | G06Q 20/108 705/40 |
| 2014/0052617 | A1* | 2/2014 | Chawla | G06Q 20/102 705/39 |
| 2017/0228711 | A1* | 8/2017 | Chawla | G06Q 20/12 |

FOREIGN PATENT DOCUMENTS

| | | | | |
|---|---|---|---|---|
| WO | 2009-072977 | A1 | 6/2009 | |
| WO | WO-2009072977 | A1 * | 6/2009 | ............. G06Q 20/02 |
| WO | WO-2010051339 | A2 * | 5/2010 | ............. G06Q 20/34 |

OTHER PUBLICATIONS

PCT International Search Report and Written Opinion, Application No. PCT/GB2017/051896, dated Sep. 8, 2017, 17 pps.
"3-D Secure—Wikipedia", Jun. 17, 2016, Retrieved from the Internet: URL: https://en.wikipedia.org/w/index.php?title=3-D_Secure &oldid=725685317, retrieved on Sep. 17, 2017, pp. 2-4.
Tot Zam, "terminology—What's the difference between a Modal, Popup, Popover and Lightbox? —User Experience Stack Exchange", Feb. 15, 2016, Retrieved from the Internet: URL: https://ux.stackexcahnge.com/questions/90336/whats-the-difference-between-a-model-popup-popover-and-lightbox, retrieved Sep. 8, 2017.
Search Report from Intellectual Property India; IN 201917000992; dated Jan. 13, 2021.

* cited by examiner

GENERATION OF WEB PAGES FOR VERIFICATION OF DATA

CROSS-REFERENCE TO RELATED APPLICATIONS

This patent application is a National Stage Entry of PCT/GB2017/051896 filed on Jun. 29, 2017, which claims the benefit and priority of Great Britain Patent Application No. 1611455.5 filed on Jun. 30, 2016, the disclosures of which are incorporated herein by reference in their entirety as part of the present application.

BACKGROUND

The present disclosure relates to a method of delivering web content to a computer user. In particular, the present disclosure relates to delivering web content to a computer user where the computer user is required to provide data for verification by a third party.

There are many examples of computer users needing to provide data to a website provider for verification, but where the verification is performed by a third party. The verification may be part of an authentication process where the identity of a user is authenticated, or as part of an authorization process where a person is authorized to be able to do something such as access a website or conduct a transaction. The use of a third party to verify the data may be because the website provider wishes to outsource the verification for technical or commercial reasons. Alternatively, the data may be sensitive and the computer user may not wish to share that data with the website provider. For example, sensitive data such as passwords or personal information may be required to access websites with restricted use, for example because of the nature or value of the content of that website. Also, conducting financial transactions over a website requires payment to be made. Typically these transactions are implemented by financial institutions rather than a merchant, and so data must be provided to the appropriate financial institution to allow authorization of the transaction and then to arrange the transaction. There are also security implications in that the user may not wish to reveal sensitive financial data to the merchant. It is at least this application of the present disclosure that is of interest to the applicant, and so the following description concentrates on this application. However, it will be appreciated that the present disclosure is not limited to applications only in the field of authorizing financial transactions, and enjoys utility over a wide range of other fields where verification of data is desired.

When making purchases on the internet, a computer user will browse a merchant's website. Usually, and as is well known, when the user wishes to purchase goods or services, the user will select an item and it is transferred to a "shopping basket" or "shopping cart". When the user has finished browsing for goods or services, the user normally selects a "go to checkout" option. When this is done, the merchant's server will present a checkout web page. Once the user has confirmed that they wish to purchase the goods or services displayed, a payment must be arranged. Generally, this requires authorization of the transaction on behalf of both the user and a financial institution. The financial institution may be a bank such as Barclays®, a card provider such as Mastercard® or a payment service provider such as Paypal®. The financial institution is referred to hereinafter as a payment authorization agent. Thus, the merchant's server must interact with the payment authorization agent to allow the payment to be authorized and effected.

For the payment to be authorized, the user must provide sensitive financial information to the payment authorization agent. This information may correspond to a card number, expiry date and CVV (card verification value) if the payment is via a debit card or credit card. If the payment is to be made by a bank transfer, the information may correspond to a sort code and account number. This information must be made available to the payment authorization agent, and this may be done in different ways.

In a first scheme, the merchant's server may provide a web page where the computer user must provide his or her financial information by way of authorizing the transaction, and to allow the transaction to be authorized by the payment authorization agent. The merchant's server may then pass the user's financial information to a server hosted by the payment authorization agent. The payment authorization agent may then verify the user's financial information. If successfully verified, the payment authorization agent will authorize the payment and arrange for the associated transfer of funds to be made, assuming that the user holds sufficient funds or credit. The payment authorization agent's server may send a confirmation that the payment has been authorized by both parties back to the merchant's server. If the authorization fails, the payment authorization agent's server may send a failure notification to the merchant's server. Once the merchant's server receives the reply from the payment authorization agent's server, the merchant's server presents a new web page to the computer user, either to confirm that the transaction has been authorized or to indicate that the transaction was not authorized.

Such an arrangement has advantages for the merchant. The merchant keeps control of the web pages and hence the browsing experience of the computer user. Thus, the merchant can present the web pages as they wish, for example to present their own branding or to provide information in an ordered and logical way. This maintains the engagement of the computer user and provides reassurance that the web page may be trusted. Also, the merchant can control the functionality of the web site, for example what links to provide, which controls to disable, presentation of security certificates, and so on. However, such an arrangement means that the computer user must provide sensitive financial information to the merchant, and this is generally disliked by consumers. It is known that consumers prefer to share their financial information with as few parties as possible, and are likely to prefer to share the information with the payment authorization agent only. The reason that users do not like sharing information with the merchant is due to the well founded belief that there is an increased security risk.

In an alternative scheme, the merchant's server redirects the computer user to a website hosted by the payment authorization agent's server. Then the payment authorization agent's server provides a web page where the user's sensitive financial information may be entered. As in the first scheme, the payment authorization agent's server may then verify the financial information entered, authorize the transaction and then notify the merchant's server of the authorization result. The payment authorization agent's server then returns the computer user to the website hosted by the merchant's server. As in the first scheme, the merchant's server then presents a new web page to the computer user, either to confirm that the transaction was authorized or to indicate that the transaction was not authorized.

This arrangement satisfies consumers' preference to share financial information with only the payment authorization agent as they enter this information only when connected to the payment authorization agent's server. The presentation of the web page by the payment authorization agent allows a high degree of trust on the part of the user. In addition, the user may check the security certificates of the payment authorization agent's web page. However, this arrangement is not liked by merchants as the merchant loses all control over the web page where financial information is provided. This includes presentation of merchant branding that keeps the consumer engaged in the browsing experience. From the computer user's perspective, the different web page representation and context switch can lead to disengagement, difficulty in finding information due to changes in layout, or even concerns regarding "spoofing" (i.e. that the webpage is a fraudulent lookalike provided by an unconnected third party to obtain financial information illicitly).

A third scheme operates as a compromise between the two schemes described above. In the third scheme, the merchant's server retains control of the web pages presented to the computer user. However, when the computer user clicks to move to the page to enter their financial information, the merchant's website presents a new page that has content provided by the payment authorization agent. This content is displayed as an iFrame. An iFrame is a type of frame used with html browsers. Frames in general allow a browser window to be split, with each frame showing different content. iFrames allow linking to different servers, i.e. the content for each iFrame may be provided by documents stored on different servers. The iFrame may be presented as a lightbox modal window. A modal window is subordinate to the main window and creates a mode of operation where only the modal window is active for interaction with the user and where the main window cannot be used. Modal windows are often used to prompt a user to provide required information. To draw attention to this task, the modal windows are often displayed as a "light box", i.e. as if the modal window is illuminated and with the other frames or main window greyed out so as to appear in the background.

IFrame functionality is used to allow the main window of the web page to be provided by the merchant while the iFrame is provided by a payment authorization agent. The computer user may then enter their sensitive financial information within the iFrame to authorize the transaction, and this financial information is verified by the payment authorization agent who authorizes the transaction. Once authorized, the merchant's server can present the next web page to confirm the transaction or to indicate that the payment failed.

This scheme is advantageous for the merchant as the merchant retains control of the web page and hence how it appears to the computer user, and so can maintain engagement of the computer user. The security of the process is improved in that the financial information is provided directly to the payment authorization agent via the iFrame. However, this arrangement is only a compromise as security is still not assured. The merchant retains overall control of the website and the merchant's server will generally be more prone to attacks, such as the insertion of malicious key logging software that operates to log the financial information entered by the computer user (so-called "clickjacking"). Hence there remains a security issue for the computer user. The computer user would rather see the payment authorization agent have control of the webpage: however, at present, the only way of achieving this is the second scheme described above, but this leads to a disconnect between the merchant's webpage and the successive payment authorization agent's webpage. This disconnect leads to security vulnerabilities in that the computer user may be maliciously redirected to a fraudulent webpage, which is difficult for the computer user to identify as even for authentic use, the genuine payment authorization agent's webpage would not contain any contextual link back to the merchant.

In addition to how financial information is collected, security concerns over the very act of providing financial information during shopping have increased for consumers. To improve security, tokenized payment schemes have been implemented that do not require sensitive financial information to be provided every time a transaction is made.

WO2009/072977 describes such a tokenized payment scheme, primarily for in-store purchases made using a smart phone. In such schemes, initially the user may perform a one-off registration process with a trusted payment authorization agent, such as their bank, such that the payment authorization agent then holds the user's financial information. Account details or card details may be provided and a nickname assigned to each account or card.

When making a purchase, the computer user asks to pay using the tokenized payment scheme. The merchant then sends transaction details to the tokenized payments scheme provider and asks for a one-time token. The tokenized payments scheme provider generates a token, saves the transaction details against the token, and sends the token to the merchant. The merchant then provides the token to the user. The user opens an app on their smart phone that is tied to a payment authorization agent, authenticates his or herself by entering a PIN or password, and enters the token by keyboard entry or scanning. The user's app then sends the token to the payment authorization agent's server. In turn, the payment authorization agent's server forwards the token to the tokenized payments scheme provider. The tokenized payments scheme provider's server uses the token to retrieve the transaction details, and to send them to the payment authorization agent who in turn forwards them to the user for the user to check the details are correct. The user may view the transaction details, and send a positive response as his or her authorization of the transaction along with an indication of the account to be used for payment that is identified using the nickname. The payment authorization agent may then authorize the transaction if funds or credit allow, and may notify the user and merchant that the transaction has been authorized. At no time during the transaction is any of the user's sensitive financial information passed to the merchant. It has been proposed to adapt such a tokenized scheme for use in internet shopping.

The present disclosure seeks to improve on these arrangements.

BRIEF DESCRIPTION

A first aspect of the present disclosure provides a method of verifying data entered by a computer user browsing web content over a computer network. The network may be any type of network including local networks, intranets and the internet. The present disclosure has particular application to a computer user browsing the world wide web over the internet according to standard protocols such as http and https.

The method includes the computer user using a browser on a computer to access a first web page from a requesting server provided by a requesting party. The computer may be of any type capable of web browsing, for example a personal computer (either desktop or laptop), or a mobile device like a tablet computer, a phablet or a smart phone. Any type of browser may be used, such as Internet Explorer®, Google Chrome®, Apple Safari® or Mozilla Firefox®.

The method further includes the computer user selecting a control presented by the first web page to request a further web page where the computer user is able to enter data that requires verification by a third party. The verification may be part of an authentication or part of an authorization. For example, the computer user may be selecting a page to allow a payment for a transaction to be authorized. Hence, reference to verification below may also be taken to be reference to authentication or authorization.

Then the method includes the requesting server redirecting the computer user's browser to a verifying server provided by a verifying party. The verifying server then provides to the computer user's browser a second web page to fulfil the request for the further web page. The second web page is presented as a foreground window positioned over a backdrop frame. The foreground window is provided with fields for entering the data. Notably, the content of the backdrop frame is provided by the requesting party.

This allows the computer user to enter the data in the foreground window such that the verifying server may verify the data. The verifying server sends the requesting server a notification as to whether or not the verification was successful.

Thus, the present disclosure turns the usual arrangement of windows and frames within a web site on its head. That is, in traditional schemes like the third arrangement described in the background to the disclosure, a website provider provides a web page into which a frame is positioned centrally and in the foreground. Thus, the website provider effectively controls the web page but only provides the content of the backdrop because the content of the foreground frame is provided by a third party.

The inventors have appreciated that it is possible to reverse this arrangement, and have developed the means to do so. That is, the inventors have realized that a frame populated with content by a third party may be manipulated to appear as a backdrop rather than in the foreground. Thus, third party content may be presented as a background frame, and the web site provider may then provide a foreground window that appears in front of the background frame. This allows data to be entered into the foreground window that is under the direct control of the web site provider.

Providing the second web page in this format addresses the problems of the prior art described above. As the verifying party is the party entrusted with the act of verifying the data, they will be the trusted party relative to the requesting party. Thus, the present disclosure meets the computer user's desire for the second web page to be provided by the verifying party such that the verifying party retains control over the web page and its functionality. This leads to improved security for the second web page where the computer user must enter their data. Furthermore, security certificates may be provided by the verifying party for inspection by the computer user. The data are entered in the foreground window that is clearly associated with the verifying party, which will foster the trust of the user.

As noted above, a problem with the prior art was the disconnect from the requesting party's webpage when the second webpage is provided by the verifying party. However, this problem is overcome by the present disclosure because the present disclosure provides the backdrop frame to the second web page that is populated with content provided by the requesting party. This means that the requesting party has control over this part of the second web page. For example, the requesting party can present the backdrop frame in its own house style and with its own branding: this allows the computer user to see that the second web page is connected with the first web page. Hence, there is no context switch and disconnect which otherwise may lead to the computer user becoming disengaged or unable to determine the authenticity of the second web page thereby allaying fears of "spoofing". Thus, improved security for the system as a whole is assured, as well as for each of the participants. In addition, the claimed arrangement fosters an increased level of trust for the user, satisfies the desire of the requesting server to retain some control of how the second webpage is presented, and also allows the verifying party to control how the data are to be entered.

The method may further include the verifying server redirecting the computer user's browser to the requesting server and the requesting server providing to the computer user's browser a third web page confirming whether or not the verification or, as noted above, authorization or authentication was successful. Accordingly, control is handed back to the requesting server that assumes responsibility for the subsequent web content delivered to the computer user's browser.

The requesting server may redirect the computer user's browser to the verifying server by sending a URL redirect to the computer user's browser. Optionally, the URL redirect contains a URL to a resource hosted by the requesting party that provides the content to be displayed in the backdrop frame. Alternatively, the requesting party may provide a URL to a resource hosted by the requesting party that provides the content to be displayed in the backdrop frame via a backchannel. The use of a backchannel is advantageous as it allows increased security.

Different ways of presenting the foreground window and backdrop frame within the second web page are possible. Some optional methods of implementing the second web page will now be described. The foreground window may be presented as a suitably-sized and suitably positioned modal window, for example to occupy a central position within the second web page. The foreground window may be presented as a lightbox relative to the backdrop frame, for example by greying out the colors of the backdrop frame. The backdrop frame may be provided as an iFrame. The backdrop frame is preferably modeless, such that the user cannot interact with the backdrop frame. IFrame is the abbreviation used for an inline frame, and refers to an HTML document embedded inside another HTML document on a website. Iframes have traditionally been used to insert content from another source, such as an advertisement, into the foreground of a web page. In the present disclosure, the traditional use of an iFrame is reversed such that the iFrame is used to insert content provided by the requesting party into a backdrop frame.

IFrames and modal windows may be implemented using HTML and Java. For example, the method may be implemented using HTML5. This is advantageous, although not essential, because of the sandbox facilities provided by HTML5. For example, the verifying server may disable all functionality of the backdrop to ensure it is modeless. The verifying server may disable all scripts, all forms or all top level browsing access associated with the backdrop (or any combination of these). The verifying server may prevent the contents of the iFrame from being treated as if they are from the same website as the window. Stylesheets may be used to position the backdrop and/or the foreground window, for example by specifying z-axis positions to ensure that the backdrop frame appears behind the foreground window.

Not all web browsers will support HTML5, or indeed may not support the more general idea of presenting the second web page with a foreground window provided over a backdrop frame provided by the requesting party. To address this, the method may further include checking to see if the computer user's browser is compatible with presenting the second web page including the foreground window and backdrop frame and, if not, redirecting the computer user's browser to a single-window web page provided with fields for entering the data. That is, a redirect may be used such that the computer user's browser displays a single sheet web page with no secondary windows such as modal windows or modeless windows: the data are simply entered into fields provided on the web page. Thus, when a computer user's browser cannot support the second web page of the present disclosure, the method simply reverts to the prior art method of handing control for the entire web page to the verifying party. This step of checking and redirecting may be performed by the requesting server or the verifying server.

Although the present disclosure has general applicability, one contemplated application is authorizing online transactions. For example, the computer user may be a consumer, the requesting party may be a merchant and the verifying party may be a payment authorization agent, and the consumer may be making a purchase from the merchant that requires a payment to be settled by the payment authorization agent. In this case, the data may be details relating to a financial account or payment card of the consumer. For example, for card payments, the data may be a card number, expiry date and CVV. For monetary transfers, the data may be a sort code and account number. If a tokenized payment is being performed, the data may correspond to a PIN, password or similar.

In addition to the overall method described above, the present disclosure resides in the methods performed by the verifying server and the requesting server.

Hence, in a second aspect, the present disclosure provides a method of verifying data entered by a computer user browsing web content over a computer network. The method includes a verifying server provided by a verifying party performing the following steps:

receiving a redirect from a requesting server hosted by a requesting party to a browser of the computer user providing to the computer user's browser a web page presented as a foreground window positioned over a backdrop frame and wherein the foreground window is provided with fields for entering data to be verified and wherein the backdrop frame contains content provided by the requesting party receiving data entered in the foreground window by the computer user verifying the data entered by the computer user sending the requesting server a notification as to whether or not the verification was successful The comments and optional features presented above in support of the first aspect of the present disclosure apply equally to this second aspect. For example, receiving the redirect from the requesting server may include receiving a URL redirect that contains a URL to a resource hosted by the requesting party that provides the content to be displayed in the backdrop frame, or may further include receiving from the requesting party via a backchannel a URL to a resource hosted by the requesting party that provides the content to be displayed in the backdrop frame.

The method may include providing the foreground window as a lightbox modal window. The method may include providing the backdrop frame as an iFrame, optionally using stylesheets to position the backdrop frame which may be done by specifying z-axis co-ordinates. The backdrop frame may be provided as a modeless window. The method may include disabling all functionality of the backdrop, for example by disabling all scripts or forms or top level browsing access associated with the backdrop. This may be done using HTML 5 sandbox commands.

The method may further include checking to see if the computer user's browser is compatible with presenting the web page including the foreground window and backdrop frame and, if not, redirecting the computer user's browser to a web page provided with fields for entering the data.

Optionally, the computer user may be a consumer, the requesting party may be a merchant and the verifying party may be a payment authorization agent, and the consumer may be making a purchase from the merchant that requires a payment to be authorized by the payment authorization agent, and the data may be details relating either to a financial account or payment card of the consumer, or to a PIN or password of the consumer.

The present disclosure also extends to a verifying server programmed to operate in accordance with the method described in any of the preceding paragraphs, a computer program that when executed by a verifying server, causes the verifying server to operate in accordance with any of the methods described in any of the preceding paragraphs, and a computer program product having stored thereon such a computer program.

In a third aspect, the present disclosure provides a method of verifying data entered by a computer user browsing web content over a computer network. The method includes a requesting server provided by a requesting party performing the following steps:

providing a first web page to a browser of the computer user receiving from the computer user's browser a signal that indicates the computer user has selected a control presented by the first web page to request a further web page where the computer user is able to enter data that requires verification by a third party sending a URL redirect to redirect the computer user's browser to a verifying server provided by a verifying party sending to the verifying server a URL to a resource hosted by the requesting party that provides content to be displayed by the verifying server receiving a notification from the verifying server as to whether or not the verification was successful The comments and optional features presented above in support of the first aspect of the present disclosure apply equally to this third aspect. For example, the method may further include receiving a redirect sent from the verifying server to the computer user's browser and providing to the computer user's browser a third web page confirming whether or not the verification was successful. The method may include sending the URL within the URL redirect or sending the URL via a backchannel. Optionally, the computer user may be a consumer, the requesting party may be a merchant and the verifying party may be a payment authorization agent, and wherein the consumer may be making a purchase from the merchant that requires a payment to be settled by the payment authorization agent, and the data may be details relating either to a financial account or payment card of the consumer, or to a PIN number or password of the consumer.

The present disclosure also extends to a requesting server programmed to operate in accordance with any of the methods described in the preceding paragraphs, to a computer program that when executed by a requesting server, causes the requesting server to operate in accordance with any of the methods described in the preceding paragraphs, and to a computer program product having stored thereon such a computer program.

BRIEF DESCRIPTION OF THE DRAWINGS

In order that the present disclosure may be more readily understood, example embodiments will now be described, by way of example only, with reference to the accompanying drawings in which.

DETAILED DESCRIPTION

Figure 1:
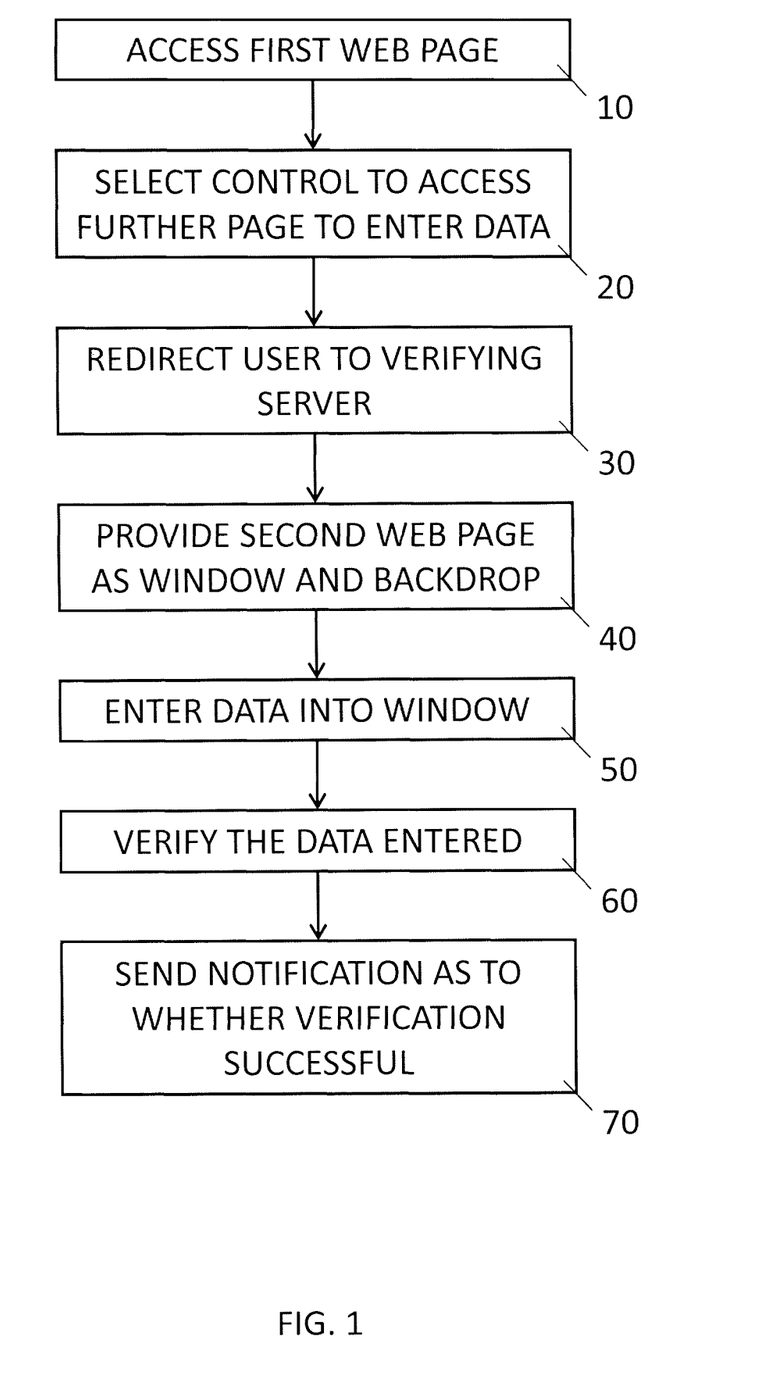
FIG. 1 is a schematic representation of a method for verifying data in accordance with an implementation of the present disclosure.

A first embodiment of the present disclosure is shown in FIG. 1. The method starts when a computer user accesses a first web page using browser software operating on a computing device. The computing device may be of any type capable of web browsing, for example a personal computer (either desktop or laptop), or a mobile device like a tablet computer, a phablet or a smart phone. The computing device is connected to a network, in this example, the internet, to allow content to be downloaded such as web pages presented using html. Web browsing is commonplace and so will not be described in further detail. Also, delivery of web content is also commonplace and well understood, so only those aspects having particular relevance to the present disclosure will be described in detail.

The computer user requests the first web page from a requesting server, for example by selecting a link or entering a URL that points to the first web page. The requesting server is operated by a requesting party to provide web content. When browsing the first web page, the computer user selects a first control to indicate that they wish to enter data that requires verification, for example as part of an authentication process or as part of an authorization process. The form and presentation of the control may vary according to the specific application. For example, a control button may be labelled "pay for goods" if an online transaction is being performed or text may be presented as a clickable link that says "secure log-on" where authentication may be required for access to a secure website. This step is illustrated in FIG. 1 at 20.

Verification is not performed by the requesting server, but is instead performed by a third party using a verifying server. When the computer user clicks on the control to indicate that they wish to enter data that requires verification, the requesting server redirects the computer user to a second web page hosted by the verifying server, as shown at 30. The verifying server is provided by a verifying party. The redirect causes the verifying server to provide the second web page to the computer user's browser, as shown at 40.

The verifying server provides the second web page as a foreground window positioned over a backdrop frame. The content of the backdrop frame is provided by the requesting party. The foreground window of the second web page has content provided by the verifying party. The foreground window includes editable text fields where the computer user may enter the data to be verified, as indicated at 50. As the second web page is provided by the verifying party, the computer user may check the security certificates associated with the second web page and will see that they are provided by the verifying party.

Once the data has been entered by the computer user, the verifying server may verify the data, for example by checking the data against entries stored in a database. In many applications, the data will correspond to two entries such as an identifier for the computer user and a password or PIN. The verifying server will then check in a database to determine whether the entries are recorded together. The verification is deemed successful if the entries are found together, otherwise the verification is deemed unsuccessful. No matter how the verification is performed, at 70 the verifying server sends a notification to the requesting server as to whether or not the verification of the data was successful.

Figure 2:
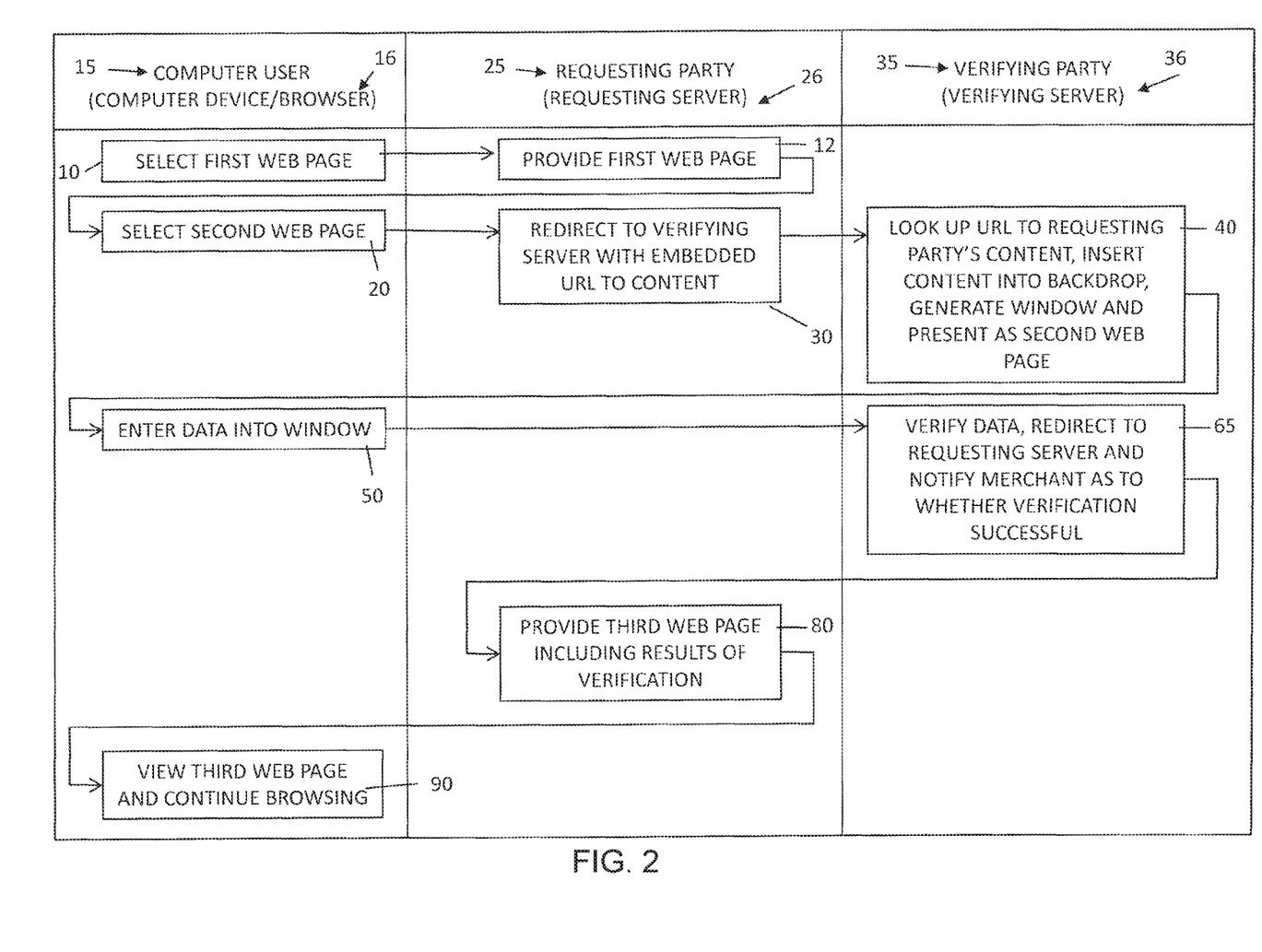
FIG. 2 is a schematic representation of flow diagram a method for verifying data in accordance with an implementation of the present disclosure.

FIG. 2 shows a further embodiment of the present disclosure. FIG. 2 shows the roles played by the computer user 15, the requesting party 25 and the verifying party 35 in respective columns. Many steps correspond to those already described with respect to FIG. 1, and like reference numerals are used to indicate like steps. Description of common steps is not repeated for the sake of brevity. Verifying party 35 may alternatively be referred to as a verifying agent, a payment authorization agent, a tokenized payments scheme provider, a consumer's bank, and a selected bank in accordance with various implementations. Computer user 15 may alternatively be referred to as a consumer in accordance with various implementations. The requesting party 25 may alternatively be referred to as a merchant.

At 10, the computer user 15 selects a first web page, for example by selecting a link or entering a URL that points to the first web page. The requesting server 26 provides the first web page to the computer user's browser 16, as shown at 12. The computer user 15 clicks a first control provided by the first web page to indicate that they wish to enter data that requires verification, as shown at 20.

When the user clicks on the control, the requesting server 26 redirects the computer user to a second web page hosted by the verifying server 36, as shown at 30. Verifying server 36 may alternatively be referred to as a payment authorization agent server, a bank server and a bank's server. The redirect contains the URL of the second web page as provided by the verifying party 35, and also contains an embedded URL link within the URL redirect. The embedded URL link points to a resource of the requesting party 25 that defines the content to be included in the backdrop frame of the second web page. The resource may be provided by the requesting server 26 or another server provided by the requesting party 25.

As shown at 40, when the verifying server 36 receives the redirect, it uses the embedded URL when constructing the second web page. For example, the verifying server 36 may construct the second web page using html with the backdrop frame appearing as an iFrame, and the contents of the backdrop frame may be defined by including the embedded URL. The contents of the backdrop frame are preferably delivered using https. The verifying server 36 also constructs the foreground window, for example as a lightbox window, and defines the content of the foreground window. The relative positions of the backdrop frame and the foreground window may be defined using stylesheets. Optionally, an intermediate window may be provided to create a shadowed effect. For example, an intermediate window with reduced opacity, say 50% opacity, may be positioned behind the lightbox window and in front of the backdrop frame to create a shadowed effect for the backdrop frame. With the second web page now constructed as an html definition, this is provided to the computer user's browser 16.

To ensure that the backdrop frame functions merely as a backdrop to the second web page, the second web page is delivered with all functionality of the backdrop frame switched off. Namely, all scripts, forms and top level browsing access may be switched off. This may be implemented using the sandbox functionality of HTML5. This provides enhanced security in that the requesting party need not worry about the threat of click-jacking software, as the backdrop frame for which they provide the content has no functionality.

The computer user 15 may enter the data to be verified in the window, as indicated at 50. At 65, the verifying server 36 verifies the data, as described with respect to step 60 of FIG. 1. Once the verification has been performed, the verifying server 36 sends a notification as to whether or not verification of the data was successful to the requesting server 26 using a secure back channel, and then the verifying server 36 redirects the computer user's browser 16 to a third web page hosted by the requesting server 26. Alternatively, the verifying server 36 may redirect the computer user's browser 16 to a third web page hosted by the requesting server 26 using a redirect that contains a notification as to whether or not verification of the data was successful. The redirect is received by the requesting server 26 and the notification, however received, is used when constructing the third web page to be presented to the computer user 15. Hence, as shown at 80, the requesting server 26 provides the third web page that either confirms to the computer user 15 that the verification was successful or notifies the computer user 15 that the verification was unsuccessful. As shown at 90, the computer user 15 may view the third web page and may then continue browsing.

Figure 3:
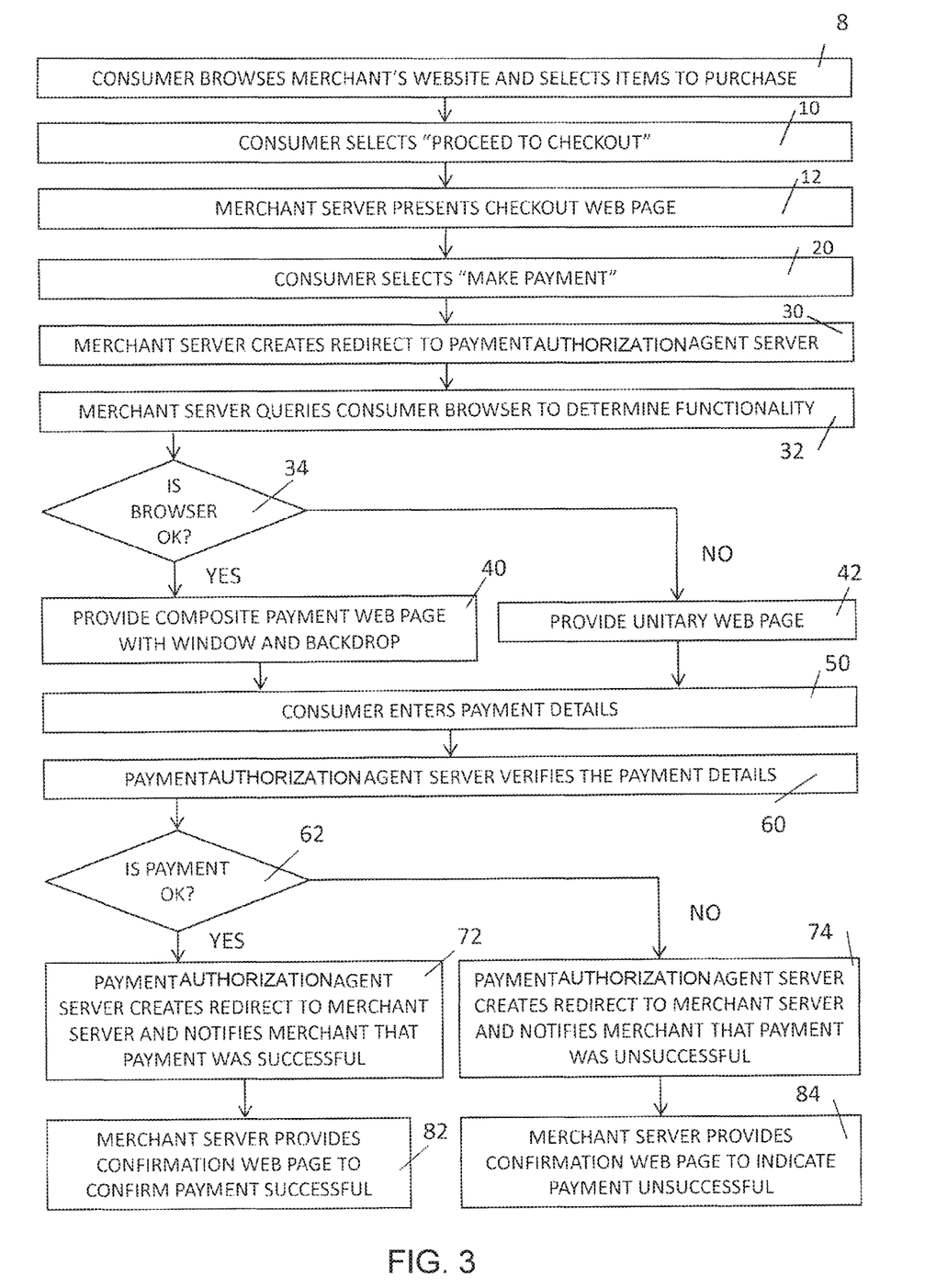
FIG. 3 is a schematic representation of a method for providing a payment authorization in accordance with an implementation of the present disclosure.

FIG. 3 shows a further embodiment of the present disclosure in the context of online shopping that requires authorization to make a payment. The computer user 15 is a consumer, the requesting party 25 is a merchant and the verifying agent 35 is a payment authorization agent. The data to be verified relates to authorizing a payment from the consumer 15 to the merchant 25 to effect purchase of items. The items may be goods or services. The data are payment details and vary according to how the transaction is to be effected. For card purchases, the payment details may correspond to one or more of the following: a card number, a start date, an expiry date, a CVV and the cardholder's name as printed on the card. For a money transfer, the payment details may correspond to one or more of the following: a bank name or other financial institution name, an account number, and a sort code. For tokenized payments like those described above, the payment details may correspond to one or more of the following: a PIN, a password, a code or token, and an account identifier such as a nickname.

The method starts at 8 with the consumer 15 browsing the merchant's website. As is well known, the consumer 15 may select items for purchase and these items are added to a virtual shopping basket or shopping cart. When the consumer 15 has finished browsing for purchases, the consumer 15 may select a button or link generally labelled "proceed to checkout". This is indicated at 10 in FIG. 3.

Selecting "proceed to checkout" causes the merchant server 26 to present a checkout web page, as indicated at 12. This checkout web page corresponds to the first web page described above. Merchant server 26 may alternatively be referred to as a requesting server and a requesting party server in accordance with various implementations. The checkout web page presents the items selected for purchase, and may allow the consumer 15 to remove items or to increase or decrease the number of each item selected for purchase. Other arrangements within checkout pages are well known. Thus, at 20, the consumer 15 may review the items selected for purchase, make any adjustments to the items and, when happy with the items selected, may select a "make payment" option.

At 30, the merchant server 26 redirects the computer user 15 to a payment web page hosted by the payment authorization agent server 36. The payment web page corresponds to the second web page described above. The redirect contains the URL of the payment web page as provided by the payment authorization agent 35, and contains an embedded URL that points to a resource provided by the merchant server 26 that defines the content to be included in a backdrop frame of the payment web page.

Upon receiving the redirect from the consumer's browser 16, the payment authorization agent server 36 queries the browser 16 to determine whether it has the functionality to present a web page as an iFrame backdrop set behind a lightbox window in the foreground. This step is indicated at 32. In this particular embodiment, the payment authorization agent server 36 queries whether or not the consumer's browser 16 is compatible with HTML5. Hence, the payment authorization agent server 36 makes a determination at 34 as to whether the consumer's browser 16 is compatible.

If the determination is negative, the method proceeds to step 42 where the payment authorization agent server 36 constructs a single-window payment web page. That is, the payment web page is a single page without further windows such as a lightbox window or other type of modal window or modeless window. As there is no backdrop frame, there is no content provided by the merchant 25. The payment web page is entirely controlled by the payment authorization agent 35, as in the manner described in the background to the disclosure section above. Thus, when increased functionality is not available in the consumer's browser 16, the method merely defaults to the prior art method and so the method at least matches the performance of the prior art. As take up of modern browsers increases, for example those supporting HTML5, the advantages of the present disclosure will be enjoyed by more and more people.

If the determination at step 34 is positive, the method proceeds to step 40 where the payment authorization agent server 36 constructs a composite payment web page including a foreground window presented over a backdrop frame. The payment authorization agent server 36 uses the embedded URL to insert content into the backdrop frame that appears as an iFrame behind the foreground window. As noted above, all functionality of the backdrop frame is switched off. The payment authorization agent server 36 also constructs the foreground window as a lightbox window. This payment web page is displayed by the computer user's browser 16. As example of such a payment web page is provided in FIG. 4, and will be described below.

Optionally, the payment authorization agent server 36 may perform a further check after a positive determination at step 34. Specifically, when constructing the payment web page, the payment authorization agent server 36 may check the content for the backdrop frame supplied by the merchant 25. If the payment authorization agent server 36 considers the content acceptable, the method may continue as before such that the composite payment web page is constructed and provided at step 40. However, if the content is not deemed acceptable by the payment authorization agent server 36, for example because the content is deemed a security risk, the payment authorization agent server 36 may revert to constructing a single-page payment web page and providing that web page at step 42.

Figure 4:
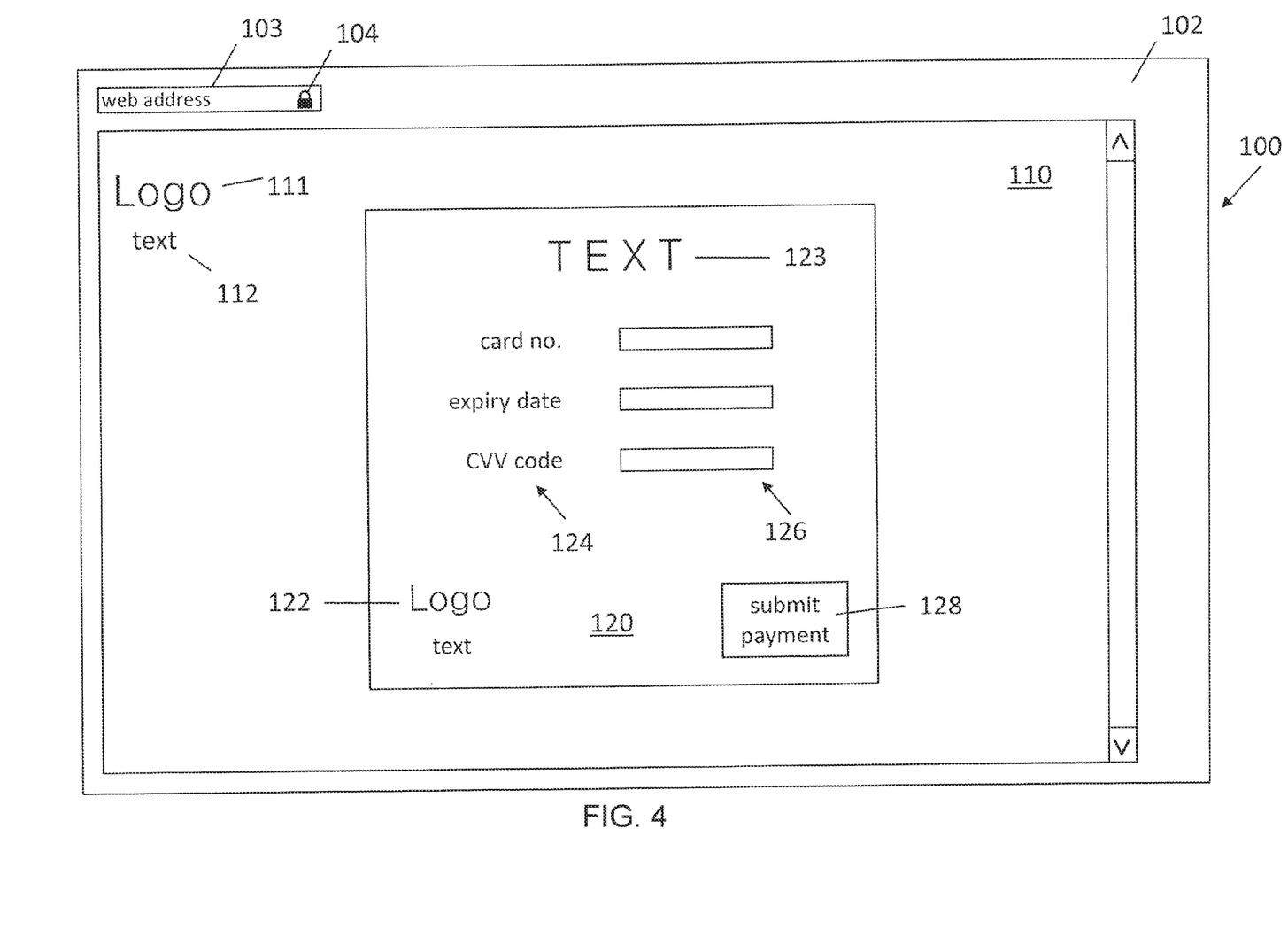
FIG. 4 shows a web page presented in accordance with an implementation of the present disclosure.

FIG. 4 shows an example of a composite payment web page 100. The payment web page 100 is presented within a border 102 provided by the consumer's browser 16 that accommodates an address field 103, menu bars, scroll bars and other navigation controls, etc. The address field 103 may contain a padlock icon 104 to confirm that a secure connection to the payment authorization agent server 36. The payment web page 100 includes a backdrop frame 110 and a foreground window 120.

The backdrop frame 110 has content provided by the merchant 25, for example a logo 111 and branding such as a strapline 112 and colors or overall appearance generally associated with the merchant 25.

The foreground window 120 appears as a lightbox and may contain branding provided by the payment authorization agent 35, for example the logo of the payment authorization agent as shown generally at 122. The foreground window 120 also contains text, as shown generally at 123, to provide context to the consumer 15. For example, the text 123 may provide confirmation that the consumer 15 is required to provide payment details in relation to a transaction and to provide confirmation of the merchant's identity. The foreground window 120 also contains a number of forms, each including text as a label 124 and a text field 126 where the consumer 15 may enter the payment details requested. In this example, a card payment is being made, and the payment details requested are the card number, the expiry date and the CVV. The text fields 126 may allow free text entry, for example to allow the consumer 15 to type the card number, or they may be drop-down menus, for example to allow the expiry date to be selected from a drop down menu for the month and another drop down menu for the year. The foreground window also contains a "submit payment" button 128 to allow the consumer 15 to authorize the payment once all the requested payment details have been entered.

The single-page payment web page contains a similar layout of form as shown in FIG. 4, but presented in a single web page without a backdrop frame supplied by the merchant 25.

Whether a composite payment web page is provided at 40 or a single-page payment web page is provided at 42, the consumer 15 enters the payment details as shown at 50 in FIG. 3. At 60, the payment authorization agent server 36 verifies the payment details as part of the authorization process. Hence, a check is made at 62 that the payment details are authentic. If found authentic, the payment authorization agent 35 checks to ensure that the consumer 15 has sufficient funds or credit to settle the transaction and, is this is found to be the case, the payment authorization agent 35 authorizes the transaction.

Once the payment has been authorized, the payment authorization agent 35 arranges the transaction from consumer 15 to merchant 25, and proceeds to step 72. The payment will also be effected by the payment authorization agent 35. At step 72, the payment authorization agent server 36 provides a notification that the transaction was successfully authorized to the merchant server 26, and redirects the consumer's browser 16 to a confirmation web page hosted by the merchant server 26. The confirmation web page corresponds to the third web page described above. The notification received by the merchant server 26 is used when constructing the confirmation web page to be presented to the consumer 15. Hence, as shown at 82, the merchant server 26 provides the confirmation web page that confirms to the consumer 15 that the authorization was successful.

If the payment details are not authentic, or if the payment authorization agent 35 does not authorize the transaction due to insufficient funds or credit, the payment authorization agent 35 provides a notification that the transaction was not successfully authorized to the merchant server 26, and redirects the computer user's browser 16 to a confirmation web page hosted by the merchant server 26, as shown at 74. The notification received by the merchant server 26 is used when constructing the confirmation web page to be presented to the consumer 15. Hence, as shown at 84, the merchant server 26 provides the confirmation web page that notifies the consumer 15 that the transaction was unsuccessful. The consumer may be presented with the option to select an alternative payment means.

Figure 5:
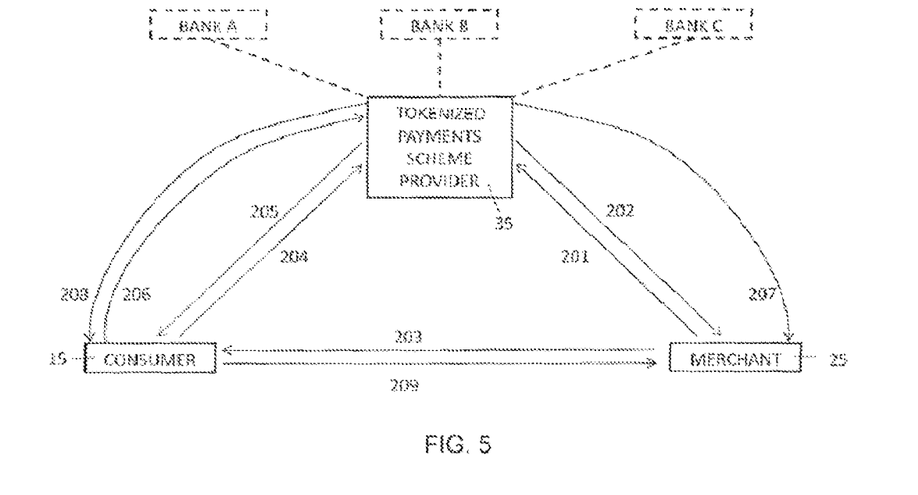
FIG. 5 is a schematic representation of a system and method for providing a tokenized payment scheme in accordance with an implementation of the present disclosure.

FIG. 5 shows a further embodiment of the present disclosure in the context of a transaction made using a tokenized payments scheme. In this embodiment, the tokenized payments scheme provider 35 fulfils the role of the payment authorization agent 35. Namely, the tokenized payments scheme provider 35 acts on behalf of one or more banks, as shown in FIG. 5 in phantom.

The transaction proceeds in much the same way as already described with respect to FIG. 3. Thus, the method starts at 8 with a consumer 15 browsing a merchant's website. Eventually the consumer 15 selects a button or link to proceed to the checkout webpage, as indicated at 10 in FIG. 3. The merchant server 26 then presents a checkout web page, as indicated at 12, which presents the items selected for purchase and also presents a "make payment" option.

When the consumer 15 selects the make payment option, the merchant 25 can then begin processing the transaction as shown in FIG. 5. The merchant 25 sends a request to the tokenized payments scheme provider 35 for a one-time token, as indicated at 201 in FIG. 5. This request also contains details of the transaction, such as the items being purchased, the cost of each item and the total cost. The tokenized payments scheme provider 35 receives the request, generates a one-time token, stores the transaction details along with the one-time token, and sends the one-time token to the merchant 25, as shown at 202.

At this stage, the merchant server 26 may perform step 34 of FIG. 3, i.e. check to determine the capability of the consumer's browser 16. The following description assumes that the consumer's browser 16 is capable of running HTML5; if not, the method proceeds in a similar way but with a single-page web page as already described with respect to FIG. 3.

At 203, the merchant server 26 sends a redirect to the consumer 15. Embedded within the redirect are both the URL that points to a resource provided by the merchant server 26 that defines the content to be included in a backdrop frame of the payment web page and also the one-time token. The redirect causes the consumer's web browser 16 to be redirected to a web site hosted by the tokenized payments scheme provider 35, as shown at 204. The tokenized payments scheme provider 35 receives the token embedded within the redirect and uses the one-time token to retrieve the transaction information stored earlier. The tokenized payments scheme provider 35 will also see the embedded URL that links to the merchant's content. The tokenized payments scheme provider 35 may assume therefore that the consumer's browser 16 is capable of displaying a composite web page, or the tokenized payments scheme provider 35 may perform a further check like that indicated at 34 of FIG. 3. Optionally, the tokenized payments scheme provider 35 may perform a further check of the content for the backdrop frame supplied by the merchant 25. If the payment authorization agent server 36 considers the content acceptable, the method may continue as before such that the composite payment web page is constructed and provided. However, if the content is not deemed acceptable by the payment authorization agent server 36, for example because the content is deemed a security risk, the payment authorization agent server 36 may revert to constructing a single-page payment web page and providing that web page. Again, in the description that follows it is assumed that this check is passed and so a composite web page is provided.

The tokenized payments scheme provider 35 then provides the consumer 15 with a composite web page, as indicated at 40 of FIG. 3. The backdrop frame is populated with the content provided by the merchant server 26 as retrieved via the URL embedded within the redirect, and the tokenized payments scheme provider 35 populates the foreground window with the transaction details, as shown at 205.

The consumer 15 may then view the transaction details and decide whether or not to authorize the transaction. The transaction details are displayed in the composite window that appears with a backdrop bearing the merchant's branding, and with the transaction details provided in a lightbox that may bear branding of the tokenized payments scheme provider 35. Hence, the consumer 15 is reassured that the transaction is authentic, and that they have not just been redirected to a fraudulent website.

When the consumer wishes to authorize the transaction, the consumer 15 enters their unique user identity and a password or PIN into text fields provided in the foreground window, and submits this information to the tokenized payments scheme provider 35 as shown at 206. By doing so, the consumer 15 effectively authenticates his or herself to the tokenized payments scheme provider 35 and implicitly authorizes the transaction. In this exemplary embodiment, the payment details entered by the consumer 15 correspond to their user identity and password. Alternatives to passwords may be used, such as a PIN or other unique authenticating information including biometric information such as a fingerprint or iris scan.

When the tokenized payments scheme provider 35 receives the authorization indicated at 206, the tokenized payments scheme provider 35 verifies the user identity and password, checks the consumer 15 has sufficient funds or credit and, if all is correct, authorizes the transaction. The tokenized payments scheme provider 35 then sends a confirmation to the merchant 25 that the transaction is authorized via a secure back channel as shown at 207. The tokenized payments scheme provider 35 also sends a redirect to the consumer's browser 16 as shown at 208. This causes the consumer's browser 16 to be redirected to a website provided by the merchant server 26 that provides notification as to whether or not the transaction was authorized, as shown at 209.

Figure 6:
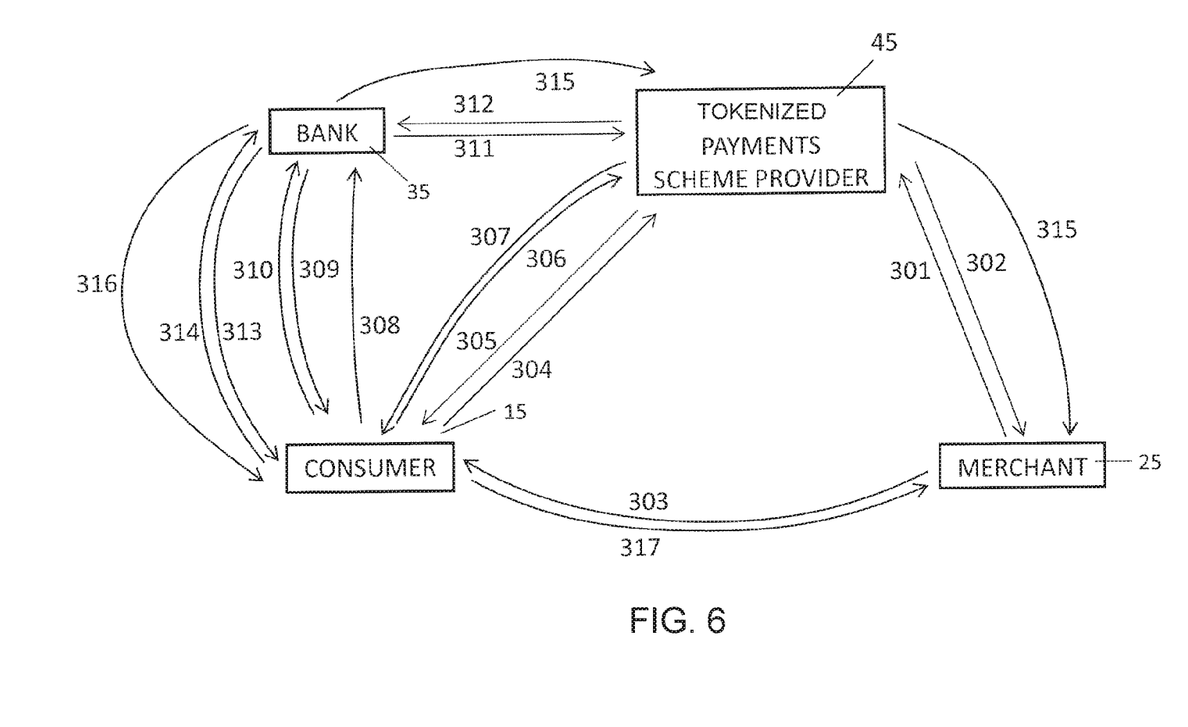
FIG. 6 is a schematic representation of a system and method for providing a tokenized payment scheme in accordance with an implementation of the present disclosure.

FIG. 6 shows a further embodiment of the present disclosure as used in an alternative tokenized payments scheme. In this embodiment, the tokenized payments scheme provider 45 does not act as a payment authorization agent 35 as this role is fulfilled by the consumer's bank 35. Thus, the tokenized payments scheme provider 45 merely acts as an intermediary to direct the consumer 15 to their bank 35 for authorization of transactions.

As for the previous embodiment described and shown in FIG. 5, the transaction proceeds in much the same way as already described with respect to FIG. 3. The arrangement shown in FIG. 6 is triggered when the consumer 15 selects the "make payment" option. At this point, the merchant 25 sends a request to the tokenized payments scheme provider 45 for a one-time token, as indicated at 301. This request also contains details of the transaction, such as the items being purchased, the cost of each item and the total cost. The tokenized payments scheme provider 45 receives the request, generates a one-time token, stores the transaction details along with the one-time token, and sends the one-time token to the merchant 25, as shown at 302.

In this embodiment, the merchant server 26 does not perform step 34 of FIG. 3, i.e. the merchant server 26 does not check to determine the capability of the consumer's browser 16, but merely assumes that it will be able to display a composite web page. At 303, the merchant server 26 sends a redirect to the consumer 15 that has embedded both the URL that points to a resource provided by the merchant server 26 that defines the content to be included in a backdrop frame of the payment web page and also the one-time token. The redirect causes the consumer web browser 16 to be redirected to a web site hosted by the tokenized payments scheme provider 45, as shown at 304.

The tokenized payments scheme provider 45 provides a web page that displays the banks that are signed up with the tokenized payments scheme provider 45, as shown at 305. The consumer 15 may then select their bank or, if they have accounts with more than one bank, selects one of the banks that he or she wishes to use for the transaction, and this selection is submitted to the tokenized payments scheme provider 45 as shown at 306. The tokenized payments scheme provider 45 then sends a redirect to the consumer's browser 16, as shown at 307. This redirect contains both the embedded URL that points to a resource provided by the merchant server 26 and also the one-time token. This redirect causes the consumer's browser 16 to redirect to a payments web page hosted by the selected bank 35, as shown at 308.

In this embodiment, the bank server 36 performs step 34 of FIG. 3, i.e. a check to determine the capability of the consumer's browser 16. The following description assumes that the consumer's browser 16 is capable of running HTML5; if not, the method proceeds in a similar way but with a single-page web page as already described with respect to FIG. 3. Optionally, the bank server 36 may perform the further check of the content for the backdrop frame supplied by the merchant 25 already described above.

The bank 35 then provides the consumer 15 with a composite web page to allow the consumer 15 to authenticate his or herself as shown at 309. The web page includes a backdrop frame populated with the content provided by the merchant server 26 as accessed via the URL embedded within the redirect, and the bank's server 36 populates the foreground window with instructions prompting entry of the authenticating information into text fields. Hence, the backdrop bears the merchant's branding and the authentication request is displayed in a lightbox having the bank's branding. Consequently, the consumer 15 is reassured that the transaction is authentic, and that they have not just been redirected to a fraudulent website.

The consumer 15 then authenticates his or herself by submitting their unique user identity and other unique password, PIN or other authenticating information including biometric information such as a fingerprint or iris scan, as shown at 310. So, in this exemplary embodiment, the payment details entered by the consumer 15 correspond to their user identity and password or alternative. When the bank 35 receives the authorization indicated at 310, the bank 35 verifies the user identity and password.

Once the consumer 15 has been verified in this way, the bank server 36 retrieves the transaction details. Specifically, the bank server 36 sends the token extracted from the redirect received from the consumer 15 to the tokenized payments scheme provider 45, as indicated at 311. The tokenized payments scheme provider 45 uses the token to retrieve the transaction details and, at 312, the tokenized payments scheme provider 45 sends the transaction details back to the bank server 36. Then, the bank 35 provides a payment web page to the consumer 15, as indicated at 313. Once more this web page is a composite web page with a backdrop frame populated with the content provided by the merchant 25 via the URL, and the bank server 36 populates the foreground window with the transaction details and a list of the accounts the consumer holds with the bank 35.

The consumer 15 may then view the transaction details and decide whether or not to authorize the transaction. The transaction details and accounts list are displayed in the composite window that appears with a backdrop bearing the merchant's branding, and with the transaction details and accounts list provided in a lightbox that may bear the bank's branding. Hence, the consumer 15 is reassured that the transaction is authentic, and that they have not just been redirected to a fraudulent website.

When the consumer 15 wishes to authorize the transaction, the consumer 15 may select one of the accounts (or, if there is only a single account available, this may be selected automatically) and the consumer 15 may then select an "authorize" button or any similar action to confirm the transaction. In this step, the account selection may correspond to the payment details that are verified by the bank 35. The authorization and account selection are sent to the bank server 36, as shown at 314.

When the bank 35 receives the authorization and account selection indicated at 314, the bank 35 verifies the account by checking that the account has sufficient funds or credit to meet the transaction, and so authorizes the transaction and effects the transaction. The bank server 36 then sends a confirmation that the transaction has been authorized to the merchant 25 via the tokenized payments scheme provider 45 using secure back channels, as shown at 315. The bank 35 also sends a redirect with the result of the authorization to the consumer's browser 16 as shown at 316. As shown at 317, this causes the consumer's browser 316 to be redirected to a website provided by the merchant server 26 that provides notification as to whether or not the transaction was authorized.

Those skilled in the art will appreciate that variations may be made to the above embodiments without departing from the scope of the disclosure that is defined by the appended claims.

In the embodiments described above, the content supplied by the requesting party 25 was made available to the verifying party 35 using a URL embedded within the redirect provided by the requesting party server 26. However, other arrangements are possible. For example, the requesting party 25 may provide a URL to the verifying party 35 via a back channel.

In the embodiment of FIG. 3, the consumer 15 selects the "make payment" option from the checkout web page after confirming the items for purchase. This arrangement may be varied. For example, further stages or web pages may be included. Further details may be collected from the consumer 15, such as their name and also a delivery address. This information may be collected on the checkout web page, or may be collected from a further web page. For example, the consumer 15 may be presented with a delivery options web page after the checkout web page, and the consumer 15 may select "make payment" from the delivery options web page or may be forwarded to the payment web page when all forms on the delivery options web page have been completed. In addition or alternatively, the consumer 15 may be required to authenticate his or herself to the payment authorization agent 35. For example, an initial web page provided by the payment authorization agent 35 may require the consumer 15 to enter a user identity and PIN or password. The data entered at the payment page provided at 40 may then be verified against the identity of the consumer 15 as established by the authentication process.

The invention claimed is:

1. A method of verifying data, comprising:
   providing access, via a browser of a computer, to a first web page from a requesting server provided by a merchant;
   receiving, via the browser, a selection of a control presented by the first web page to request a further web page that provides an ability to enter data that requires verification by a third party;
   receiving, by the browser, a redirect instruction from the requesting server to a verifying server provided by a payment authorization agent, where the redirect instruction includes a Uniform Resource Locator (URL) of a second web page and an embedded URL that points to a resource provided by the requesting server, and wherein the verifying server is different from the requesting server;
   receiving, by the browser, the second web page provided by the verifying server to fulfill the request for the further web page, wherein the second web page comprises a foreground window and a backdrop frame, and wherein:
      the foreground window is presented as being positioned over the backdrop frame;
      the foreground window is provided with fields for entering the data; and
      the backdrop frame is provided by the payment authorization agent based on content accessible using the embedded URL, wherein the embedded URL is associated with the merchant and the backdrop frame provided via the embedded URL includes content provided by the merchant; and
   receiving the data in the foreground window of the second web page for verification of the data by the verifying server.

2. The method of claim 1, further comprising at least one of:
   providing the foreground window as a lightbox window and the backdrop frame as an iFrame;

using stylesheets to position at least one of the backdrop frame and the foreground window; and disabling functionality of the backdrop frame using one or more HTML5 sandbox commands.

3. The method of claim 1, further comprising:

receiving by the browser a redirect from the verifying server to the requesting server; and receiving, by the browser, a third web page from the requesting server confirming whether or not the verification was successful.

4. The method of claim 1, wherein:

the entered data comprises at least one of: a financial account of a consumer, a payment card of the consumer, a personal identification number (PIN) of the consumer, and a password of the consumer.

5. The method of claim 1, wherein the second URL comprises at least one of an embedded URL within the URL redirect and a URL provided from the merchant via a back channel.

6. A method of verifying data over a computer network comprising a requesting server provided by a merchant, comprising:

providing a first web page to a browser of a computer;

receiving, from the browser, a signal indicating a selection of a control presented by the first web page to request a further web page that allows entry of data requiring verification by a third party;

sending a redirect instruction to the browser, the redirect instruction includes the Uniform Resource Locator (URL) redirect providing an ability for the browser to be redirected to a verifying server provided by a payment authorization agent and an embedded URL that points to a resource provided by the requesting server, and wherein the verifying server is different from the requesting server;

sending retrieving a second website, from the verifying server, wherein the embedded URL to the resource hosted by the merchant that provides first content to be displayed while second content is provided directly by the verifying server in a foreground frame of the browser; and receiving a notification from the verifying server as to whether or not the verification was successful.

7. The method of claim 6, further comprising:

in response to the redirect of the browser from the verifying server to the requesting server, providing, to the browser, a third web page confirming whether or not the verification was successful.

8. The method of claim 6, wherein:

the entered data comprises at least one of: a financial account of a consumer, a payment card of the consumer, a personal identification number (PIN) of the consumer, and a password of the consumer.

9. The method of claim 6, wherein sending, to the verifying server, the embedded URL to the resource comprises:

sending the URL to the resource to the verifying server using a back channel.

* * * * *